United States Patent
Flint et al.

(10) Patent No.: US 9,679,453 B2
(45) Date of Patent: Jun. 13, 2017

(54) SYSTEM AND METHODS FOR CORRELATING SOUND EVENTS TO SECURITY AND/OR AUTOMATION SYSTEM OPERATIONS

(71) Applicant: Vivint, Inc., Provo, UT (US)

(72) Inventors: Jason C. Flint, Provo, UT (US); Craig Matsuura, Draper, UT (US); Michael D. Child, Lehi, UT (US); JonPaul Vega, Highland, UT (US); Jefferson Lyman, Alpine, UT (US); Matthew J. Eyring, Provo, UT (US); Jeremy B. Warren, Draper, UT (US); James Ellis Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/918,300

(22) Filed: Oct. 20, 2015

(65) Prior Publication Data
US 2017/0109983 A1    Apr. 20, 2017

(51) Int. Cl.
*G08B 1/00* (2006.01)
*G08B 13/16* (2006.01)
*G08B 13/196* (2006.01)

(52) U.S. Cl.
CPC ... *G08B 13/1672* (2013.01); *G08B 13/19695* (2013.01)

(58) Field of Classification Search
CPC .................. G08B 13/1672; G08B 13/19695
USPC ................................................. 340/541, 540
See application file for complete search history.

(56) References Cited

U.S. PATENT DOCUMENTS

| | | | |
|---|---|---|---|
| 8,862,252 B2 | 10/2014 | Rottler et al. | |
| 8,872,915 B1 | 10/2014 | Scalisi et al. | |
| 8,903,716 B2 | 12/2014 | Chen et al. | |
| 2002/0026311 A1 | 2/2002 | Okitsu | |
| 2003/0156688 A1* | 8/2003 | McCarty | H04M 1/642 379/67.1 |
| 2007/0024451 A1 | 2/2007 | Albert | |
| 2008/0198006 A1 | 8/2008 | Chou | |
| 2014/0156283 A1 | 6/2014 | Himmelstein | |
| 2014/0169795 A1* | 6/2014 | Clough | G06F 19/3418 398/106 |
| 2014/0188471 A1 | 7/2014 | Haughay | |

(Continued)

FOREIGN PATENT DOCUMENTS

| | | |
|---|---|---|
| CN | 102568127 | 7/2012 |
| KR | 1020110061540 A | 6/2011 |

OTHER PUBLICATIONS

Ma et al., Semantic Labeling of Nonspeech Audio Clips, Hindawi Publishing Corporation, EURASIP Journal on Audio, Speech, and Music Processing, vol. 2010, Article ID 404860, 12 pages.

(Continued)

*Primary Examiner* — Ojiako Nwugo
(74) *Attorney, Agent, or Firm* — Holland & Hart LLP

(57) ABSTRACT

A method for security and/or automation systems is described. In one embodiment, the method may include detecting a first sound event at a home entry point using one or more sensors. The method may further include receiving input to associate at least one home automation system operation with the first sound event, and may further include storing the first sound event. The method may further include initiating the at least one home automation system operation associated with the first sound event.

18 Claims, 7 Drawing Sheets

(56) References Cited

U.S. PATENT DOCUMENTS

2015/0324706 A1* 11/2015 Warren .............. H04L 12/2803
 700/275
2015/0347734 A1* 12/2015 Beigi ..................... G06F 21/32
 713/155

OTHER PUBLICATIONS

English Machine translation of CN102568127. Jul. 11, 2012.
PCT International Search Report for International Application No. PCT/US2016/055182, mailed Jan. 2, 2017 (5 pp.).

* cited by examiner

SYSTEM AND METHODS FOR CORRELATING SOUND EVENTS TO SECURITY AND/OR AUTOMATION SYSTEM OPERATIONS

BACKGROUND

The present disclosure, for example, relates to a security and/or automation system, and more particularly to implementing at least one home automation system operation based, at least in part, on comparing a received monitored sound event with a received input regarding at least one home automation system operation associated with the sound event.

Home automation systems are widely deployed to provide various types of communication and functional features such as monitoring, communication, notification, and/or others. These systems may be capable of supporting communication with a user through a communication connection or a system management action.

Typically, when a guest approaches a front door and knocks, rings the doorbell, or otherwise announces his presence, the homeowner is unaware of the identity of the knocking guest, and has only two options for responding to the knock: opening the door, or not opening the door. The homeowner may check a peephole to learn the identity of the knocking guest, but in order to do so, the homeowner must approach the door, and likely must reveal his presence to the knocking guest. Additionally, where the homeowner is not home at the time of the guest's knock, the homeowner may not know who came to the door, and may not have any means by which to respond to the knocking guest's approach.

SUMMARY

Existing guest identification means may provide for video cameras positioned at the front door, and in some cases may provide facial recognition technologies, to identify the knocking guest. Yet these methods may be unreliable in accurately identifying the guest, and may still require direct homeowner response to the knock. Existing voice recognition systems may also provide for identification of guests, but may be limited to identifying known visitors. Accordingly, it may be desirable to provide a means by which the identity of the knocking guest may be determined using audio detection systems not limited to voice detection, and by which the user may be notified of the knocking guest's identity. Further, it may be desirable to implement one or more functionalities of a home automation system on the basis of the knocking guest's identity.

Accordingly, in one embodiment, a method for security and/or automation systems is provided. In one embodiment, the method may comprise detecting a first sound event at a home entry point using one or more sensors. The method may further comprise receiving input to associate at least one home automation system operation with the first sound event, and may further comprise storing the first sound event. The method may further comprise initiating the at least one home automation system operation associated with the first sound event.

In some embodiments, a detected knocking event may be compared with a precompiled library of known audio signals stored at the home automation system in order to identify and authenticate the knock or other sound event. Thus, the library may contain a plurality of sound clips and/or sound "fingerprints" associated with one or more known sound events and the guest who produces them. For example, the library may contain clips of knocks for the homeowner's family, friends, neighbors, and regular delivery people, such that when any of those guests knocks or produces an audio signal corresponding with the sound clips stored in the library, that guest may be authenticated and identified by the home automation system. The sound "fingerprints" may include data related to any of knock or other audio input intensity, source, location, duration, pattern, or the like. Thus, sound characteristics may be identified in three primary categories, including temporal composition (such as the timing of a knock event pattern), spectral composition (such as amplitude and frequency characteristics produced by the striking surface materials), and spectrotemporal composition (for enhanced signal discrimination to distinguish deliberate sound events from ambient noise).

A "knock" may include any audio signal produced by a guest that is intended to call the homeowner to the door. For example, a "knock" may include a rapping, slapping, pounding, or kicking on the door, doorframe, or windows or walls surrounding the door, or may further include clapping, ringing a bell, unlocking a door, turning or jiggling a doorknob, walking up steps, calling out or whistling, approaching in a car, or any other detectable audio signal. The audio signal may be detected by an audio and/or video monitoring or recording device positioned at one or more entry and exit point of the home. For example, a video monitoring device may be positioned above a front door in some embodiments, or in other embodiments a microphone may be integrated with a doorbell. In some embodiments, the audio detecting means may be continuously operational and "listening"; in other embodiments, the audio detecting means may be initiated based on occupancy detection data, such as detected motion, light, vibration, or the like.

Upon authenticating and identifying the guest, the home automation system may, in some embodiments, communicate the identity of the knocking guest to the homeowner, for example at a dedicated application on the homeowner's smartphone, or at a control panel. In some embodiments, the communicated guest's identity may be accompanied by a video feed or still photograph of the guest at the front door, for example recorded by a video monitor positioned at the front door. In the event that the guest cannot be identified based on the detected knock, the mere detection of the knock may nevertheless trigger a communication to the homeowner, accompanied in some cases by a picture or video of the guest and notifying the homeowner that the knocking guest is unidentified.

In other embodiments, upon authenticating and identifying the guest, the home automation system may compare the identity of the guest with inputted user preferences regarding home automation system operations to implement for that identified guest. For example, the user may input a preference indicating that, where the FedEx deliveryman is identified as knocking at the door, a recorded voice message should be broadcasted at the front door, telling the deliveryman to please leave the package on the bench by the front door. In other embodiments, the user may input a preference indicating that, where the user himself is identified by the unique audio associated with the sound of the user's car engine approaching the house, the garage door should be opened and the door leading from the garage to the house should be unlocked. In examples in which the knocking guest is unidentified, the user preferences with respect to an unidentified guest may be implemented, such as locking doors or initiating a video monitor. Any combination of identified guests or users and preferred home automation system operation instructions are envisioned.

In some embodiments, the home automation system may implement various system operations to suggest that the home is occupied upon detecting an attempted break-in. For example, interior lights may be turned on, stereos or televisions turned on, or the like, in response to the detection of glass break, excessive vibration or force against a door, excessive manipulation of a door lock, or the like.

Over time, the home automation system may adaptively learn user preferences in response to guests knocking, and may automatically derive home automation system operation instructions based on observed user patterns. For example, where an unidentified guest knocks on the door or produces some auditory signal, the home automation system may observe that the homeowner consistently inputs an instruction to broadcast a message to leave the package near the door in response to the received knock. Thus, the home automation system may infer that the knocking guest is a delivery person, and may accordingly derive an operation instruction corresponding with this guest such that, when the guest comes to the door in the future, the system may implement the operation instruction. In some embodiments, the home automation system may communicate a confirmation request to the user, for example at a dedicated application on the user's smartphone, indicating the proposed operation instruction and awaiting user confirmation before implementing the operation instruction. In other embodiments, the home automation system may communicate a notification to the user after the operation has been implemented.

In addition, the home automation system may adaptively learn over time to recognize guests based on detected patterns in their knocking styles. For example, the home automation system may detect that a particular guest consistently knocks on the door with an evenly spaced three-rap knuckle knock in the middle of the door. Using other identification techniques, such as voice recognition or facial recognition, the home automation system may identify the guest as Sally, and may add the sound clip and/or sound fingerprint of Sally's knock to the library of known audio signals. In some embodiments, the home automation system may adaptively learn to recognize guests based on detected temporal patterns, such as identifying that Sally visits the home at the same time every Tuesday to take her piano lesson. Thus, when Sally knocks in the future, the home automation system may communicate Sally's identity to the user notifying him of her presence at the door, or in addition or alternatively, may implement one or more home automation system operations corresponding with user inputted preferences or derived patterns specific to Sally, such as unlocking the door.

In some embodiments, the guest may be identified solely based on the detected sound event, whereas in other embodiments, the guest may be identified by any combination of a sound event, facial recognition, voice recognition, or the like. In this way, the likelihood of a false positive for a recognized guest may be reduced by corroborating the identification means.

In further embodiments, identified sound events may be associated with the homeowner(s) himself. For example, a sound event such as the sound of the homeowner's car engine as he pulls into the driveway, or the sound of the garage door opening, may be identified by one or more sensors. The home automation system may then compare the detected sound event with inputted user preferences regarding actions to be taken, such as unlocking the front door, turning on interior lights, disarming alarm systems, adjusting the thermostat, issuing a personalized auditory or visual greeting, or the like. In some embodiments, a homeowner may input a preference to silence alarms and auditory notifications when the home automation system detects that the homeowner has returned home after a certain hour at night, so as to avoid awakening other members of the household.

In some embodiments, particular sound events may be associated with a child returning home alone. For example, a child may use a particular input code, may have a discernible walk or knocking pattern, or may speak a predetermined auditory command, which may indicate to the home automation system that the child is returning home alone. Using a plurality of occupancy sensors positioned throughout the home, the home automation system may further identify that there are no other occupants in the home. A particular "home alone" home automation system operation profile may accordingly be implemented on the basis of determining that the child is home alone. For example, the home automation system may communicate an instruction to the security system to arm all point of entry sensors, while disarming interior motion sensors, and may further communicate an instruction to the exterior door locking mechanisms to lock all exterior doors. According to user-inputted preferences, the home automation system may further derive an instruction to disable doorbell sounds, and instead communicate any visitor identifications to the homeowners at their mobile devices, so as to avoid the child's attempting to answer the door. Other user inputted preferences associated with individual home occupants are also envisioned.

In some embodiments, a non-transitory computer-readable medium storing-computer-executable code is described. The code may be executable by a processor to detect a first sound event at a home entry point using one or more sensors, receive input to associate with the at least one home automation system operation with the first sound event, store the first sound event, and initiate the at least one home automation system operation associated with the first sound event.

In another embodiment, an apparatus for security and/or automation systems is described. The apparatus may comprise a processor, memory in electronic communication with the processor, and instructions stored in the memory. The instructions may be executable by the processor to detect a first sound event at a home entry point using one or more sensors, receive input to associate with the at least one home automation system operation with the first sound event, store the first sound event, and initiate the at least one home automation system operation associated with the first sound event.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to providing a means for detecting sound events at an entry point of a home, and comparing the detected sound events to received input regarding at least one home automation system operation. Moreover, the systems and methods described herein relate to implementing at least one home automation system operation based, at least in part, on comparing the detected sound events with the received input regarding the home automation system operations.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
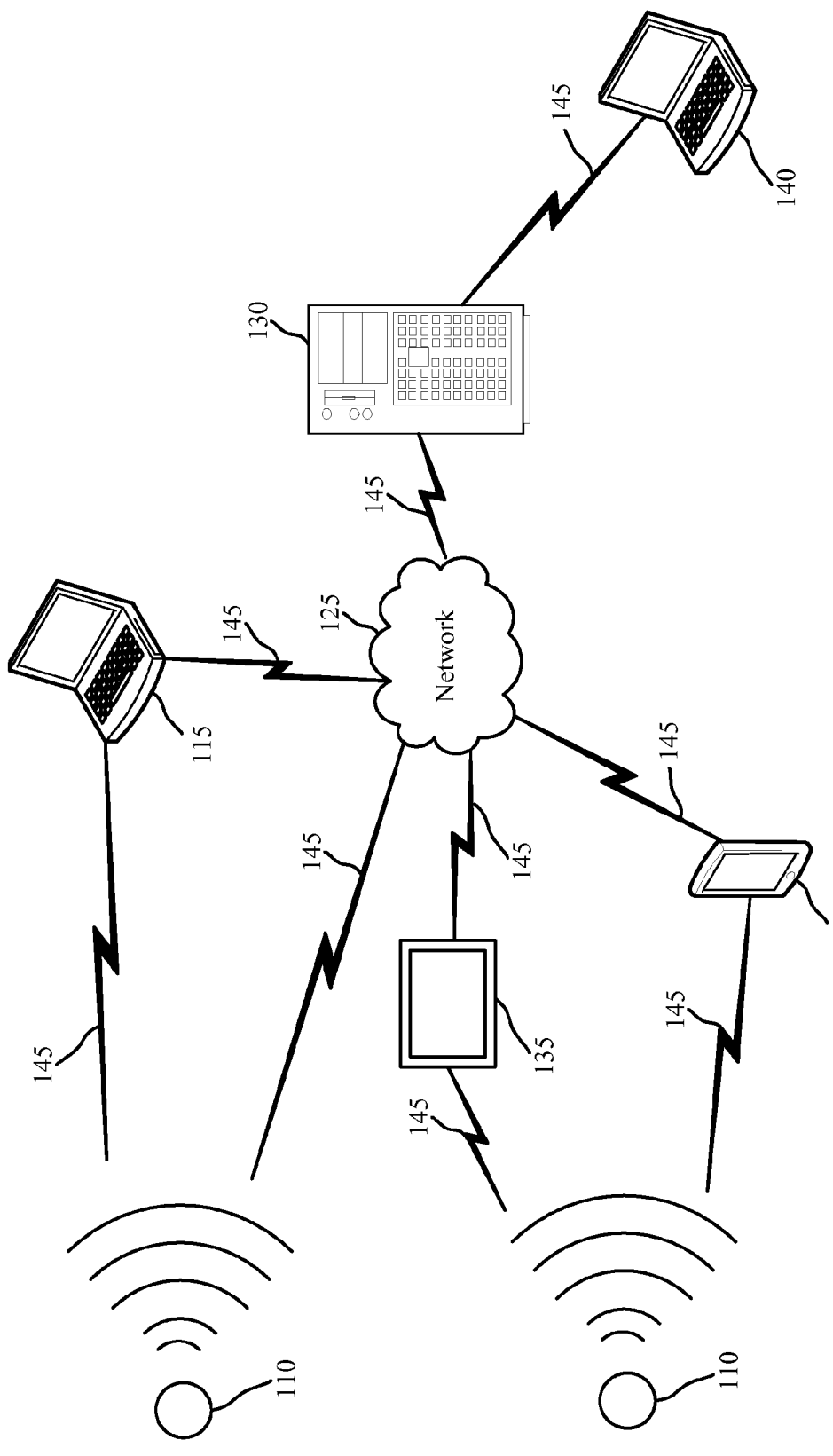
FIG. 1 is a block diagram of an example of a security and/or automation system, in accordance with various embodiments.

FIG. 1 is an example of a home automation system 100 in accordance with various aspects of the disclosure. In some embodiments, the home automation system 100 may include one or more sensor units 110, a local computing device 115, 120, a network 125, a server 130, a control panel 135, and a remote computing device 140. The network 125 may provide user authentication, encryption, access authorization, tracking, Internet Protocol (IP) connectivity, and other access, calculation, modification, and/or functions. The control panel 135 may interface with the network 125 through wired and/or wireless communication links 145 and may perform communication configuration, adjustment, and/or scheduling for communication with local computing device 115, 120 or remote computing device 140, or may operate under the control of a controller. Control panel 135 may communicate with a backend server 130—directly and/or indirectly—using one or more communication links 145.

The control panel 135 may wirelessly communicate via communication links 145 with the local computing device 115, 120 via one or more antennas. The control panel 135 may provide communication coverage for a geographic coverage area. In some examples, control panel 135 may be referred to as a control device, a base transceiver station, a radio base station, an access point, a radio transceiver, a home automation control panel, a smart home panel, a security panel, or some other suitable terminology. The geographic coverage area for control panel 135 may be divided into sectors making up only a portion of the coverage area. The home automation system 100 may include one or more control panels 135 of different types. The control panel 135 may be related to one or more discrete structures (e.g., a home, a business) and each of the one more discrete structures may be related to one or more discrete areas. Control panel 135 may be a home automation system control panel, for example an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

In any embodiment, control panel 135 may comprise a comparing module, described in more detail below with respect to FIGS. 2-3. The control panel 135 may be operable to receive input regarding at least one home automation system operation, and to receive detected sound events from the one or more sensor units 110. The control panel 135 may further be operable to compare the detected sound events with the received input regarding the at least one home automation system operation, and implement the at least one home automation system operation based, at least in part, on the comparing.

In some embodiments, control panel 135 may comprise one or more sensor units such that control panel 135 may directly detect sound events. In other embodiments, control panel 135 may receive detected sound event data from one or more sensor unit 110, from a local computing device 115, 120, or from a remote computing device 140.

The local computing devices 115, 120 may be dispersed throughout the home automation system 100 and each device 115, 120 may be stationary and/or mobile. Local computing devices 115, 120 and remote computing device 140 may be custom computing entities configured to interact with one or more sensor units 110 via network 125, and in some embodiments, via server 130. In other embodiments, local computing devices 115, 120 and remote computing device 140 may be general purpose computing entities. A computing device 115, 120 or 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A computing device 115, 120 or 140 may also include or be referred to by those skilled in the art as a user device, a sensor, a smartphone, an iPod®, an iPad®, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A local computing device 115, 120, remote computing device 140, and/or control panel 135 may include and/or be one or more sensors that sense: proximity, motion, temperatures, vibration, humidity, sound level or auditory input, smoke, structural features (e.g., glass breaking, window position, door position), time, geo-location data of a user and/or a device, distance, biometrics, weight, speed, height, size, preferences, light, darkness, weather, time, system performance, heart rate, respiration rate, and/or other inputs that relate to a home automation system. A local computing device 115, 120 may be able to communicate through one or more wired and/or wireless communication links 145 with various components such as control panels, base stations, and/or network equipment (e.g., servers, wireless communication points, etc.) and/or the like.

The communication links 145 shown in home automation system 100 may include uplink (UL) transmissions from a local computing device 115, 120 to a control panel 135, and/or downlink (DL) transmissions from a control panel 135 to a local computing device 115, 120. The downlink transmissions may also be called forward link transmissions while the uplink transmissions may also be called reverse link transmissions. Each communication link 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 145 may transmit bidirectional communications and/or unidirectional communications. Communication links 145 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to home automation systems.

In some embodiments of home automation system 100, control panel 135 and/or local computing devices 115, 120 may include one or more antennas for employing antenna diversity schemes to improve communication quality and reliability between control panel 135 and local computing devices 115, 120. Additionally or alternatively, control panel 135 and/or local computing devices 115, 120 may employ multiple-input, multiple-output (MIMO) techniques that may take advantage of multi-path, mesh-type environments to transmit multiple spatial layers carrying the same or different coded data.

While the local computing devices 115, 120 may communicate with each other through the control panel 135 using communication links 145, each local computing device 115, 120 may also communicate directly with one or more other devices via one or more direct communication links 145. Two or more local computing devices 115, 120 may communicate via a direct communication link 145 when both devices 115, 120 are in the geographic coverage area or when one or neither devices 115, 120 is within the geographic coverage area. Examples of direct communication links 145 may include Wi-Fi Direct, Bluetooth, wired, and/or other P2P group connections. The devices 115, 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within home automation system 100.

In some embodiments, one or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required. Additionally, in alternate embodiments, one or more sensor units 110 may be integrated with control panel 135, and/or control panel 135 may be integrated with local computing device 115, 120, such that separate components are not required.

The local computing devices 115, 120 and/or control panel 135 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 and/or control panel 135 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 and/or control panel 135 may be operable to control operation of the output of the local computing devices 115, 120 and/or control panel 135. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 and/or control panel 135 to the output.

The remote computing device 140 may be a computing entity operable to enable a remote user to monitor the output of the one or more sensor units 110, or to receive a status report or message relating to the detected sound event as compared with the input regarding the at least one home automation system operation. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to sound events detected at an entry point of the home. Each sensor unit 110 may be capable of sensing multiple sound event parameters, or alternatively, separate sensor units 110 may monitor separate sound event data parameters. For example, one sensor unit 110 may be an occupancy detection sensor, configured to detect user approach to an entry point of the home by monitoring any one or more of light, vibration, motion, or the like. Another sensor unit 110 (or, in some embodiments, the same sensor unit 110) may detect sound events at the entry point of the home, where the sound events may comprise any of a knock; a doorbell; a slap, kick, pound, or rap on the door, doorframe, or windows surrounding the door; or the sound of a car engine approaching. In some embodiments, one or more sensor units 110 may additionally monitor alternate user parameters, for example using voice or facial recognition technologies. In alternate embodiments, a visitor may input a code at a control panel located at the entry point of the home, where the inputted code may be detected as a sound event or other visitor identification means.

In some embodiments, the one or more sensor units 110 may be separate from the control panel 135, and may be positioned at various locations around the perimeter of the home or property, usually near entry or exit points of the home or property. In other embodiments, the one or more sensor units 110 may be integrated or collocated with home automation system components or home appliances or fixtures. For example, a sensor unit 110 may be integrated with a doorbell. In still other embodiments, the one or more sensor units 110 may be integrated or collocated with the control panel 135 itself.

Data gathered by the one or more sensor units 110 may be communicated to local computing device 115, 120, which may be, in some embodiments, a thermostat or other wall-mounted input/output home automation system display. In other embodiments, local computing device 115, 120 may be a personal computer or smartphone. Where local computing device 115, 120 is a smartphone, the smartphone may have a dedicated application directed to collecting and processing detected sound event data. The local computing device 115, 120 may process the data received from the one or more sensor units 110 by comparing the received sound event data with the received input regarding the at least one home automation system operation. The local computing device 115, 120 may then communicate an action instruction to at least one aspect of the home automation system to implement the at least one home automation system operation. In alternate embodiments, remote computing device 140 may process the data received from the one or more sensor units 110, via network 125 and server 130, to obtain action instructions for the at least one aspect of the home automation system. Data transmission may occur via, for example, frequencies appropriate for a personal area network (such as Bluetooth or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the one or more sensor units 110 or local computing devices 115, 120, or may simply forward the received information to the remote computing device 140 and control panel 135.

Server 130 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 130 may receive a stream of occupancy data based on motion detection from a sensor unit 110, a stream of sound event data from the same or a different sensor unit 110, and a stream of user facial recognition data received from the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database or library (e.g., in memory) containing sound event data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with detected sound event data.

Figure 2:
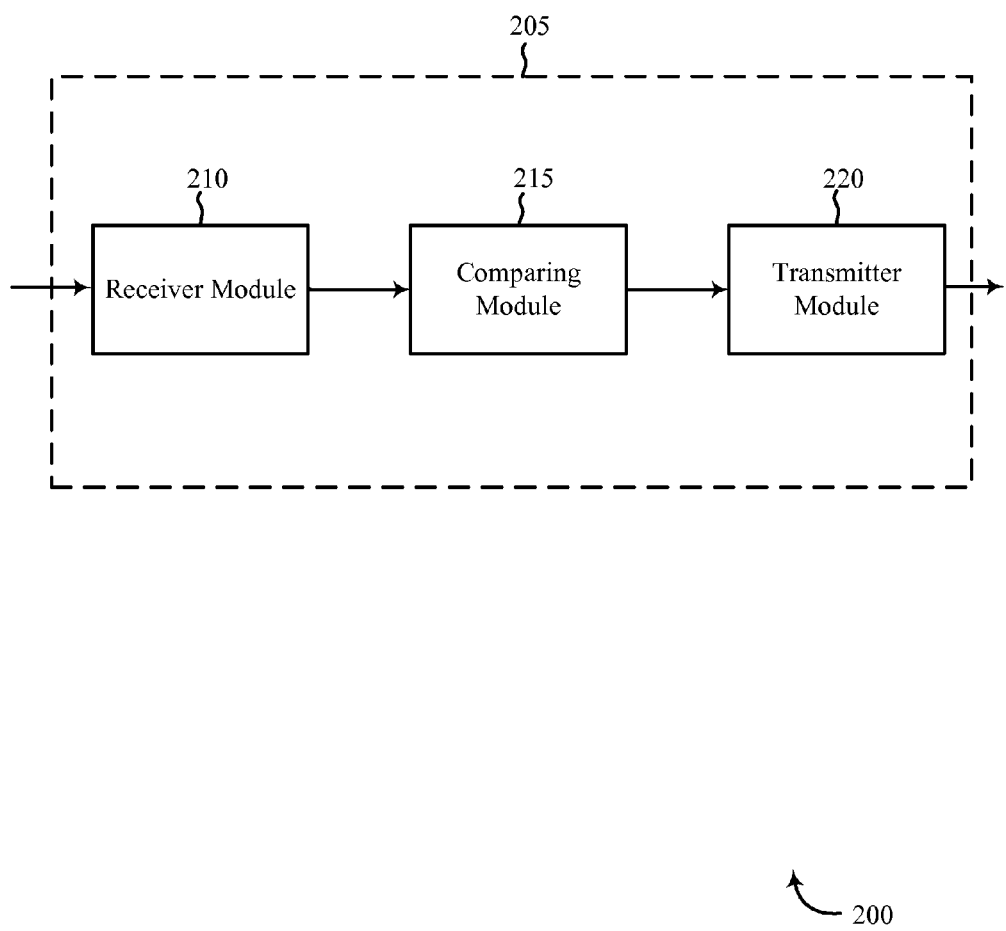
FIG. 2 shows a block diagram of a device relating to a security and/or automation system, in accordance with various aspects of this disclosure.

FIG. 2 shows a block diagram 200 of an apparatus 205 for use in security and/or automation systems, in accordance with various aspects of this disclosure. The apparatus 205 may be an example of one or more aspects of a control panel 135, or in other embodiments may be an example of one or more aspects of the one or more sensor units 110, or in still other embodiments may be an example of one or more aspects of the local computing device 115, 120 or remote computing device 140, each of which is described with reference to FIG. 1. The apparatus 205 may include any of a receiver module 210, a comparing module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive input regarding at least one home automation system operation. For example, a user may input at a control panel or in a dedicated application on a smartphone preferences relating to a particular visitor, which may include, for example, broadcasting a prerecorded message telling the visitor to leave the package by the front door. In another example, a user may input at a control panel or personal computer preferences relating to another particular visitor, which may include, for example, turning on the outdoor lights, unlocking the front door, and disarming the security system. Various home automation system operations are envisioned, and may be triggered by detecting any sound events associated with particular visitors for whom the operations have been inputted. In some embodiments, sound events may be monitored on a continual basis, while in other embodiments, sound events may be detected only upon detecting occupancy data at an entry point of the home, for example by detecting motion at a front door of the home.

The receiver module 210 may receive detected sound event data from the one or more sensor units, control panel, or local computing devices. Where apparatus 205 is one or more sensor unit, the detected sound event data may be received at the apparatus 205 and communicated directly to the receiver module 210. In embodiments where apparatus 205 is a control panel, local computing device, or remote computing device, the detected sound event data may be communicated, for example via a wireless communication link, from the one or more sensor unit monitoring the sound event data to the receiver module 210 at apparatus 205.

The detected sound event data, and input regarding the at least one home automation system operation received at receiver module 210, may then be communicated to comparing module 215, which may compare the monitored sound event data with the received input regarding the at least one home automation system operation. For example, the comparing module 215 may compare the sound event detected from an approaching car engine with inputted user preferences regarding home automation system operations to be initiated when the particular car engine is detected. On the basis of the comparing, the comparing module 215 may derive an action instruction indicating the various aspects of the home automation system that should be implemented according to the user inputted preferences, such as opening the garage door and turning on the lights, and may then communicate the action instructions to transmitter module 220.

Transmitter module 220 may communicate the received action instructions derived at comparing module 215 to the appropriate one or more aspects of the home automation system. For example, the action instructions may indicate that the front porch light should be turned on and the security system should be armed. Accordingly, the transmitter module may communicate the action instructions to the lighting and security systems, which may implement the action instructions accordingly. In another example, the action instruction may indicate that the front door should be locked or unlocked, and the transmitter module 220 may accordingly communicate the locking or unlocking action instruction to the front door locking mechanism.

Figure 3:
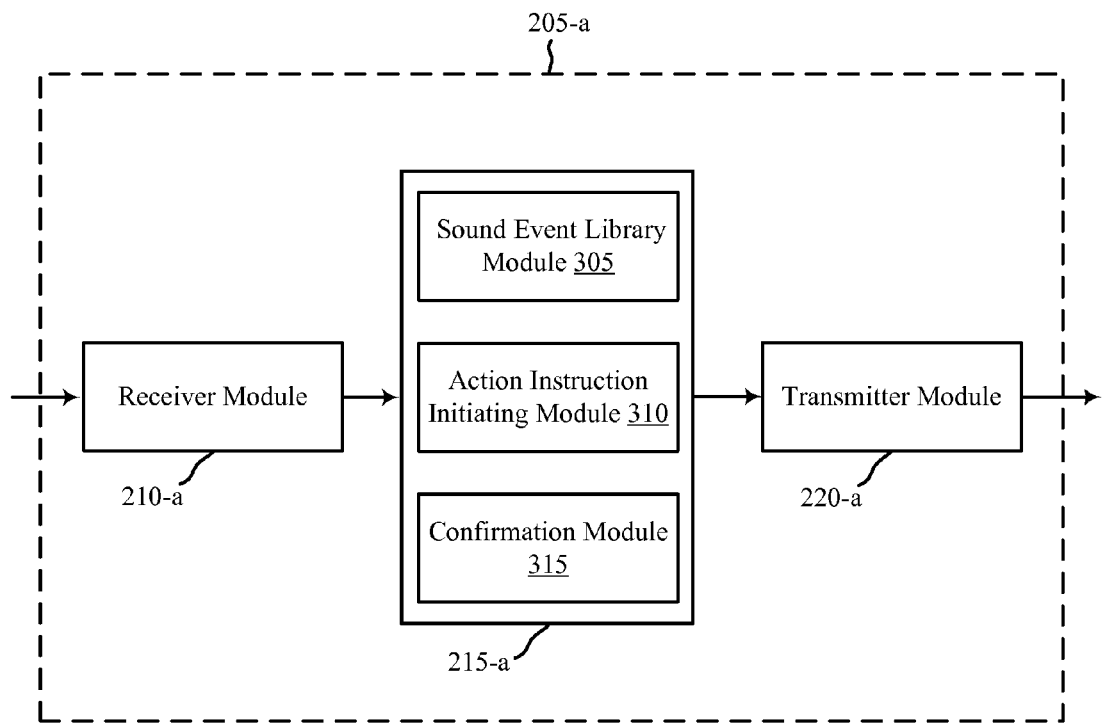
FIG. 3 shows a block diagram of a device relating to a security and/or automation system, in accordance with various aspects of this disclosure.

Apparatus 205-a, which may be an example of apparatus 205 illustrated in FIG. 2, is further detailed in FIG. 3. Apparatus 205-a may comprise any of a receiver module 210-a, a comparing module 215-a, and/or a transmitter module 220-a, each of which may be an example of the receiver module 210, the comparing module 215, and the transmitter module 220 as illustrated in FIG. 2. Apparatus 205-a may further comprise, as a component of the comparing module 215-a, any one or more of a sound event library module 305, an action instruction initiating module 310, and a confirmation module 315.

The components of apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

As previously discussed, apparatus 205-a may be any of a control panel, a local computing device, or one or more sensor unit. Receiver module 210-a may operate in the same manner as described with respect to FIG. 2. Specifically, receiver module 210-a may receive detected sound event data, and may additionally receive inputted instructions from a user regarding at least one home automation system operation associated with a sound event. The sound event data may be monitored directly by the apparatus 205-a, or may be communicated to apparatus 205-a from any of one or more sensor unit, control panel, or local computing device. In other embodiments, sound event data may be inputted directly at the apparatus 205-a by the user, for example in the form of a code.

The received detected sound event data may be communicated from the receiver module 210-a to the comparing module 215-a. The comparing module 215-a may then compare the received detected sound event data with the appropriate corresponding home automation system operation. For example, a user may have inputted a home automation system operation associated with Sally, who knocks in a three-rap pattern on an upper-left section of the front door. Upon detecting the three-rap pattern, the comparing module 215-a may compare that sound event to the stored sound event associated with Sally, and may associate the detected sound event with the stored home automation system operation, for example indicating that the front door should be unlocked so that Sally can come inside for her piano lesson.

Based upon comparing the received sound event data with the appropriately coinciding at least one home automation system operation, action instruction initiating module 310 may derive at least one appropriate action instruction for implementing the at least one home automation system operation. The action instructions derived by action instruction initiating module 310 may direct implementation of the operation by any one or more component of the home automation system, or may alternatively or in addition be directed to communicating visitor identity information to the user. For example, action instruction initiating module 310 may communicate a still photograph or video clip of the visitor at the front door to the user, for example at a smartphone or control panel. In some embodiments, as discussed in more detail below with respect to FIG. 4, the identity of the visitor or entity producing the sound event may be identified, and the identity information may accompany the communication to the user alerting him of the visitor's presence at the door. Action instructions derived by action instruction initiating module 310 may be communicated to transmitter module 220-a, which may in turn communicate the action instructions to the appropriate home automation system component(s).

Comparing module 215-a may also comprise a confirmation module 315, which may operate in conjunction with the action instruction initiating module 310 to communicate a confirmation message to a user prior to transmitting the action instruction to the appropriate at least one home automation system component. For example, action instruction initiating module 310 may determine, based on the detected sound event data and input regarding the at least one home automation system operation, that the front door should be unlocked to allow the visitor to enter, and that the interior lights in the home should be turned on. The confirmation module 315 may accordingly communicate a confirmation message to the user, via transmitter module 220-a, requesting user confirmation prior to implementing the door and light action instructions. A user may receive the confirmation request message at, for example, a control panel, or alternatively at a dedicated application on his smartphone or personal computer. The user may be presented in the message with a list of the actions to be taken in conjunction with the home automation system operation, and may approve or deny all or some of the actions accordingly. The user approval or disapproval may then be communicated to apparatus 205-a, received by receiver module 210-a, and communicated to action instruction initiating module 310 to confirm that the action instruction, in part or in its entirety, should be communicated to transmitter module 220-a for dissemination to the appropriate one or more components of the home automation system for implementation. This confirmation step may be included or excluded according to individual user preferences inputted at the home automation system.

Figure 4:
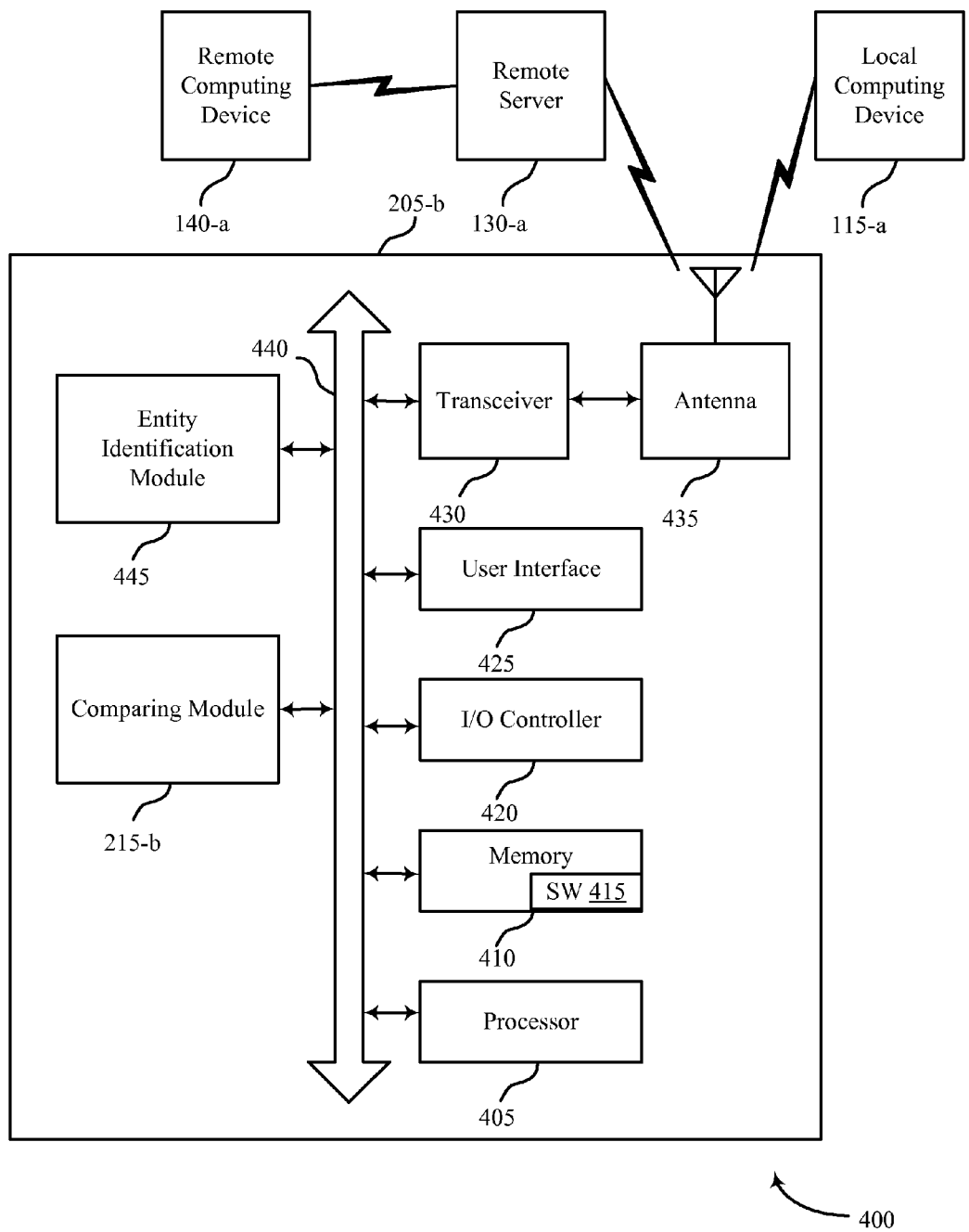
FIG. 4 shows a block diagram relating to a security and/or automation system, in accordance with various aspects of this disclosure.

FIG. 4 shows a system 400 for use in detecting one or more sound events, and comparing the detected sound event data with received input regarding at least one home automation system operation, in accordance with various examples. System 400 may include an apparatus 205-b, which may be an example of the control panel 135 or one or more sensor units 110 of FIG. 1. Apparatus 205-b may also be an example of one or more aspects of apparatus 205 and/or 205-a of FIGS. 2 and 3.

Apparatus 205-b may include a comparing module 215-b, which may be an example of the comparing module 215, 215-a described with reference to FIGS. 2 and 3. Apparatus 205-b may also include components for comparing detected sound event data with the received input regarding at least one home automation system operation, and for operating at least one aspect of the home automation system based, at least in part, on the comparing. For example, entity identification module 445 may be operable to identify the user or other entity from whom the sound event has been detected, such that the detected sound event data may be compared with the appropriate corresponding input regarding the at least one home automation system operation. Further, entity identification module 445 may be operable to identify the entity using one or more of voice recognition or facial recognition technologies. The entity's voice or facial features may be compared, in some embodiments, to an existing database of voices and facial features, or in other embodiments may be compared with publicly available databases, such as social media and government websites. In one embodiment, a detected sound event may be received at the entity identification module 445, which may use a variety of known identification methods to identify the entity producing the sound event. The entity identity and sound event data may then be communicated to the comparing module 215-b, which may compare the detected sound event data with the received input regarding at least one home automation system operation for the particular identified entity. For example, the received input may indicate that, where the homeowner himself is identified, the door should be unlocked, the interior lights turned on, the alarm system disarmed, and the thermostat adjusted to 69 degrees. The comparing module 215-b may therefore receive the sound event data, and identity data from entity identification module 445 indicating the particular entity producing the sound event, and may implement the appropriate home automation system operations for the identified entity accordingly. In this way, various system operations specific to individual entities may be implemented with specificity.

In some examples, the detected sound event may be a spoken command, and the individual speaking the command may be identified using voice recognition technologies. For example, one user speaking the command, "Vivint, I'm home," may prefer that all interior lights be turned on, the security system disarmed, and the thermostat set to 70 degrees. In another example, a second user speaking the same command, "Vivint, I'm home," may prefer that only lights in the kitchen and living room be turned on, that the security system remain armed with the exception of motion detectors, and that the thermostat be set to 68 degrees, for example. By identifying the user issuing the verbal command, or in other embodiments producing a particular knock or clapping pattern, or by identifying the user approaching an entry point of the home, the home automation system may implement one or more system operation specific to the identified user.

Apparatus 205-b may also include components for bi-directional data communications including components for transmitting communications and components for receiving communications. For example, apparatus 205-b may communicate sound event data, input regarding at least one home automation system operation, and derived action instructions for at least one aspect of the home automation system bi-directionally with one or more of a local computing device 115-a, a remote server 130-a, and/or a remote computing device 140-*a*. This bi-directional communication may be direct (e.g., apparatus 205-*b* communicating directly with local computing device 115-*a*) or indirect (e.g., apparatus 205-*b* communicating with remote computing device 140-*a* via remote server 130-*a*). Remote server 130-*a*, remote computing device 140-*a*, and local computing device 115-*a* may be examples of remote server 130, remote computing device 140, and local computing device 115, 120 as shown with respect to FIG. 1.

As previously discussed, the comparing module 215-*b* may receive sound event data and input regarding at least one home automation system operation, and may compare the received sound event data with the received input regarding the home automation system operations. In this way, comparing module 215-*b* may be operable to implement home automation system operations without the need for direct user input.

Apparatus 205-*b* may also include a processor module 405, and a memory 410 (including software (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of remote server 130-*a* or local computing device 115-*a*. The transceiver module 430 may include a modem to modulate the packets and provide the modulated packets to the one or more antennas 435 for transmission, and to demodulate packets received from the one or more antennas 435. While an apparatus comprising a control panel (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 130-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information neither specific nor exclusive to itself.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive sound event data and input regarding at least one home automation system operation, compare the received sound event data with the input regarding at least one home automation system operation, operate at least one aspect of the home automation system, etc.). Alternatively, the software/firmware code 415 may not be directly executable by the processor module 405 but may cause a computer (e.g., when compiled and executed) to perform functions described herein.

In some embodiments the processor module 405 may include, among other things, an intelligent hardware device (e.g., a central processing unit (CPU), a microcontroller, and/or an ASIC, etc.). The memory 410 may contain, among other things, the Basic Input-Output system (BIOS) which may control basic hardware and/or software operation such as the interaction with peripheral components or devices. For example, the comparing module 215-*b* may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this disclosure. Code to implement the present disclosure may be stored in a non-transitory computer-readable medium such as one or more of system memory 410 or other memory. The operating system provided on I/O controller module 420 may be iOS®, ANDROID®, MS-dOS®, MS-WINDOWS®, OS/2®, UNIX®, LINUX®, or another known operating system.

The components of the apparatus 205-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 5:
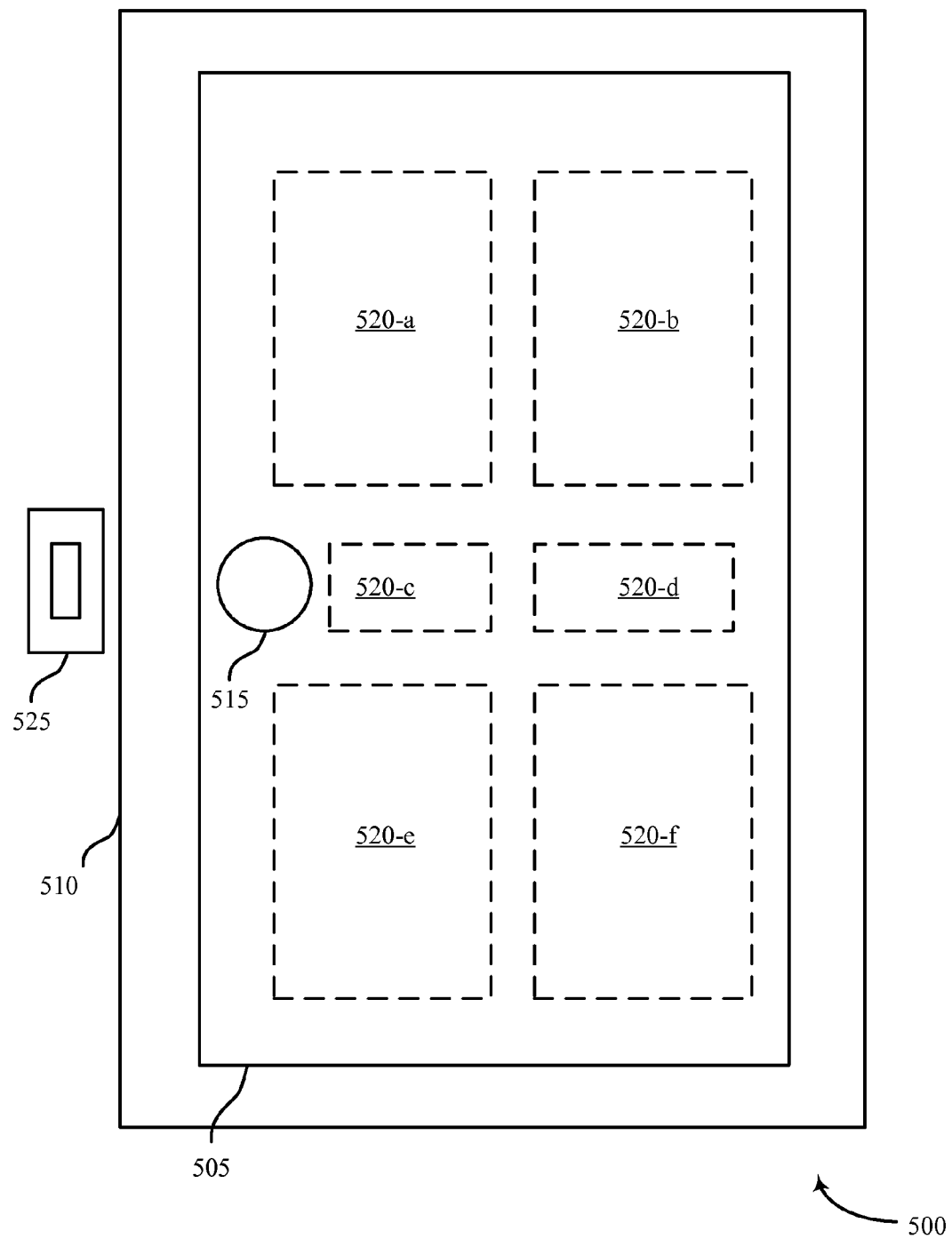
FIG. 5 is a block diagram of an example of a home entry point in accordance with various aspects of this disclosure.

FIG. 5 is a block diagram illustrating an example of a front entry point 500 in a home, in accordance with various embodiments. In some embodiments, front entry point 500 may comprise an exterior door 505 of a home or other building. Although described as a front entry point, door 505 may be positioned at any outer entry point of the home or other property, such as a back or side door, a garage door, or a gate. For clarity, front entry point 500 is described as being utilized in conjunction with one or more sensor units 110 as described in FIGS. 1 and 4. In some embodiments, the one or more sensor units may be individual components, while in other embodiments, the one or more sensor units may be collocated or integrated with one or more of a control panel 135, local computing device 115, 120, or remote computing device 140, as described with respect to FIG. 1.

The one or more sensor units may be located near, or integrated with, portions of the door 505 in some embodiments, may be integrated with a doorbell 525 in other embodiments, or may be integrated with a doorknob 515 in still other embodiments. In some embodiments, one or more sensor units may be integrated with an exterior light fixture or video monitoring system. The one or more sensor units may be configured to detect any one or more of occupancy data and sound event data. In some embodiments, the detection of sound event data may be triggered only by the detection of occupancy data, while in other embodiments, sound event data may be monitored on a continuous or interval basis. For example, a sensor unit integrated with the doorbell 525 may be operable to detect the approach of an entity to the door 505 using motion sensing technology. The same sensor unit, or in some examples a separate sensor unit, may be further operable to detect one or more sound event occurring at or near the door 505. The one or more sensor units may detect any one or more of audio input intensity, source, location, duration, pattern, or the like. The one or more sensor units may be further operable to detect one or more of amplitude and frequency characteristics produced by the striking surface materials.

For example, the one or more sensor units may detect a series of slaps, raps, knocks, pounds, kicks, or other percussive strikes on the door 505 or doorframe 510. The location of the strikes may be identified by the one or more sensor units as having occurred in any of a plurality of portions of the door 505, such as in the upper left quadrant 520-a, upper right quadrant 520-b, lower left quadrant 520-e, lower right quadrant 520-f, middle left section 520-c, or middle right section 520-d of the door 505. In other embodiments, various divisions and combinations of locations on the door 505, doorframe 510, or area surrounding the door are contemplated. The location of the strikes may be further identified and differentiated on the basis of the amplitude and frequency characteristics produced by the differing materials of the striking surfaces, for example between the door 505 and doorframe 510.

In further embodiments, the one or more sensor units may detect any sound event associated with one or more of the doorbell 525 or doorknob 515. For example, the sensor units may detect the sound of the doorbell 525 being rung one or more times for various durations of time and at various intervals. Additionally or alternatively, the one or more sensor units may detect the sound of a key being inserted into the lock associated with doorknob 515, or the sound of doorknob 515 being turned or jiggled. In still other embodiments, the one or more sensor units may detect sound events located near the door 505 but not directed at the door 505, doorframe 510, doorknob 515, or doorbell 525. For example, the one or more sensor units may detect the sound of an entity clapping, stamping, snapping, whistling, speaking, yelling, walking, or the like. In still other embodiments, the one or more sensor units may detect the sound of an approaching car engine, which may be identifiable as unique to the particular car to which the engine belongs.

The sound event data detected by the one or more sensor units may be stored in a memory, as discussed in more detail with respect to FIGS. 1-4. This memory may comprise a sound event library, and may store sound event data in the form of sound "fingerprints" or sound clips relating to the detected sound event data. These sound fingerprints may be unique to the entity producing the sound event, and may therefore be utilized by the home automation system to identify the entity producing the sound event, and to initiate one or more home automation system operations associated with the detected sound event on each occasion that the sound event is identified. Thus, for example where a homeowner's mother approaches the homeowner's front door at the same pace each visit, and rings the doorbell using the same double-ring pattern and duration, the home automation system may identify the homeowner's mother as the same entity each time she visits, and may initiate the system operations inputted by the homeowner, such as turning on the porch light and unlocking the front door, each time she visits. In this way, visitors may be identified by their unique sound profiles without the need for voice or facial feature recognition, which may be limited to pre-stored data and may be unreliable in use. In other embodiments, one or more of voice and facial feature recognition may be used in conjunction with detection of sound events in order to bolster or corroborate entity identifications.

Figure 6:
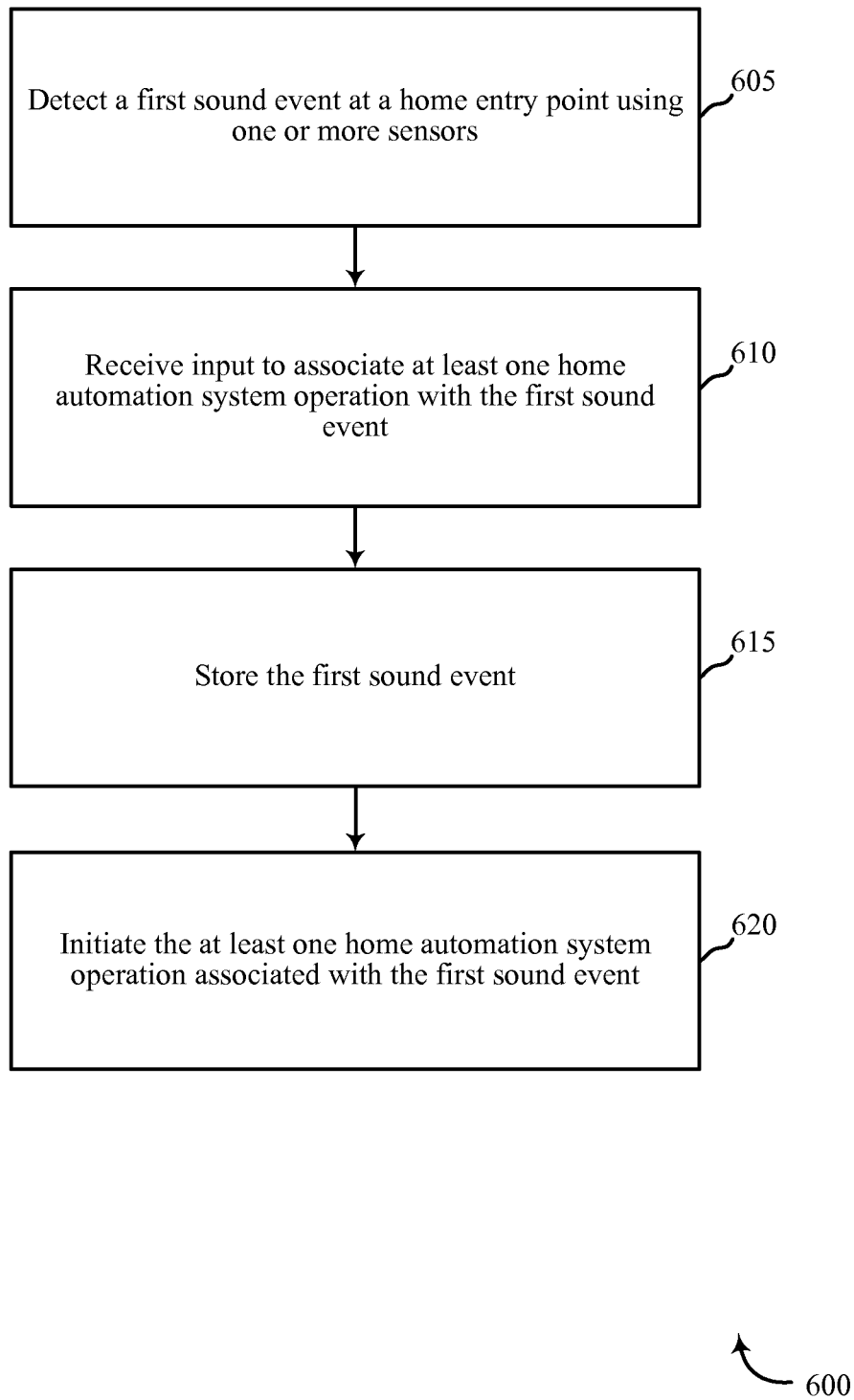
FIG. 6 is a flow chart illustrating an example of a method relating to a security and/or automation system, in accordance with various aspects of this disclosure.

FIG. 6 is a flow chart illustrating an example of a method 600 for security and/or automation systems, in accordance with various embodiments. For clarity, the method 600 is described below with reference to aspects of one or more of the sensor units 110, local computing device 115, 120, control panel 135, and/or remote computing device 140 described with reference to FIGS. 1-4, and/or aspects of one or more of the apparatus 205, 205-a, or 205-b described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 605, the method 600 may include detecting a first sound event at a home entry point using one or more sensors. As previously discussed, the first sound event may be detected as a result of continuous or interval sound event monitoring, or in other embodiments may be detected only as a result of having received occupancy data that triggered sound event detection. In some embodiments, this first sound event may be initiated by the homeowner himself, in order to store sound event data in the home automation system for future use by himself or guests. In other embodiments, this first sound event may be produced by a visitor.

At block 610, the method 600 may include receiving input to associate at least one home automation system operation with the first sound event. As previously stated, a homeowner may input preferences regarding at least one home automation system operation to be implemented. For example, a homeowner may input at a control panel, or at a dedicated application on a local or remote computing device, preferences for various components of the home automation system to be activated, deactivated, or modified based upon a detected sound event. Where the homeowner has initiated the first sound event himself, the homeowner may then input his preferences with respect to one or more home automation system operations to associate with the detected first sound event. For example, the homeowner may knock three times quickly in the upper left quadrant of his front door, and may thereafter input a preference to associate that particular sound event with broadcasting a prerecorded voice message to the front door indicating that the delivery person should leave the package by the side door. In other embodiments, where the detected first sound event has been produced by a visitor, the input received may be a result of the homeowner responding to the detected sound event in real-time. For example, a visitor may ring the doorbell in three long, evenly-spaced increments, and the homeowner may respond by arming his security system and locking the front door, for example by inputting these preferences at a control panel in the home, or at a dedicated application on his smartphone.

In either embodiment, at block 615, the method 600 may include storing the first sound event, for example in a sound event library. The first sound event may be stored in the sound event library with the associated at least one home automation system operation. Thus, where the homeowner has produced the first sound event himself and followed the sound event with input regarding home automation system operation preferences associated with the sound event, the sound event and associated preferences may be stored together in the sound library such that, upon detecting that same sound event in the future, the home automation system may automatically initiate the associated at least one home automation system operation. In addition or alternatively, where the first sound event has been produced by a visitor, and the homeowner has responded in real-time by inputting a preference for at least one home automation system operation in response to the first sound event, the first sound event and associated system operation may be stored in the sound event library, such that the home automation system may "learn" the user's preferences in real-time and may implement these preferences when the same sound event is detected in the future.

At block 620, the method 600 may include initiating at least one home automation system operation associated with the first sound event. Thus, where the homeowner has produced the first sound event, and has inputted a preference for at least one home automation system operation associated with the first sound event, the home automation system may accordingly initiate the at least one home automation system operation according to the homeowner's preferences. Alternatively, where the first sound event has been produced by a visitor and the homeowner has responded in real-time by inputting a preference to, for example, lock the door and arm the alarm system, the home automation system may accordingly initiate these inputted preferences.

The method 600 may be repeated any number of times such that the homeowner may manually input and store a plurality of sound events associated with various home automation system operation preferences, and/or such that the homeowner may respond in real-time with a plurality of different system operation preferences associated with a plurality of visitors or entities producing sound events. In some embodiments, the preferences for the at least one home automation system operation may be inputted by the homeowner locally, for example at a control panel in the home. In other embodiments, where the homeowner is, for example, in the backyard or away from his property at the time of the sound event, the detected sound event may be communicated to the homeowner at, for example, a dedicated application on his smartphone, and the homeowner may respond to the sound event with his inputted preferences regarding at least one home automation system operation at the smartphone. In this way, the homeowner may be notified of, and may actively respond to in real-time, any visitors to his home, regardless of whether he is home to receive the visitors.

The operations at blocks 605, 610, 615, and 620 may be performed using the receiver module 210, 210-*a*, the comparing module 215, 215-*a*, 215-*b*, the transmitter module 220, 220-*a*, and/or the transceiver module 430, described with reference to FIGS. 2-4.

Thus, the method 600 may provide for sound event detection methods related to a security and/or automation system. It should be noted that the method 600 is just one implementation and that the operations of the method 600 may be rearranged or otherwise modified such that other implementations are possible.

Figure 7:
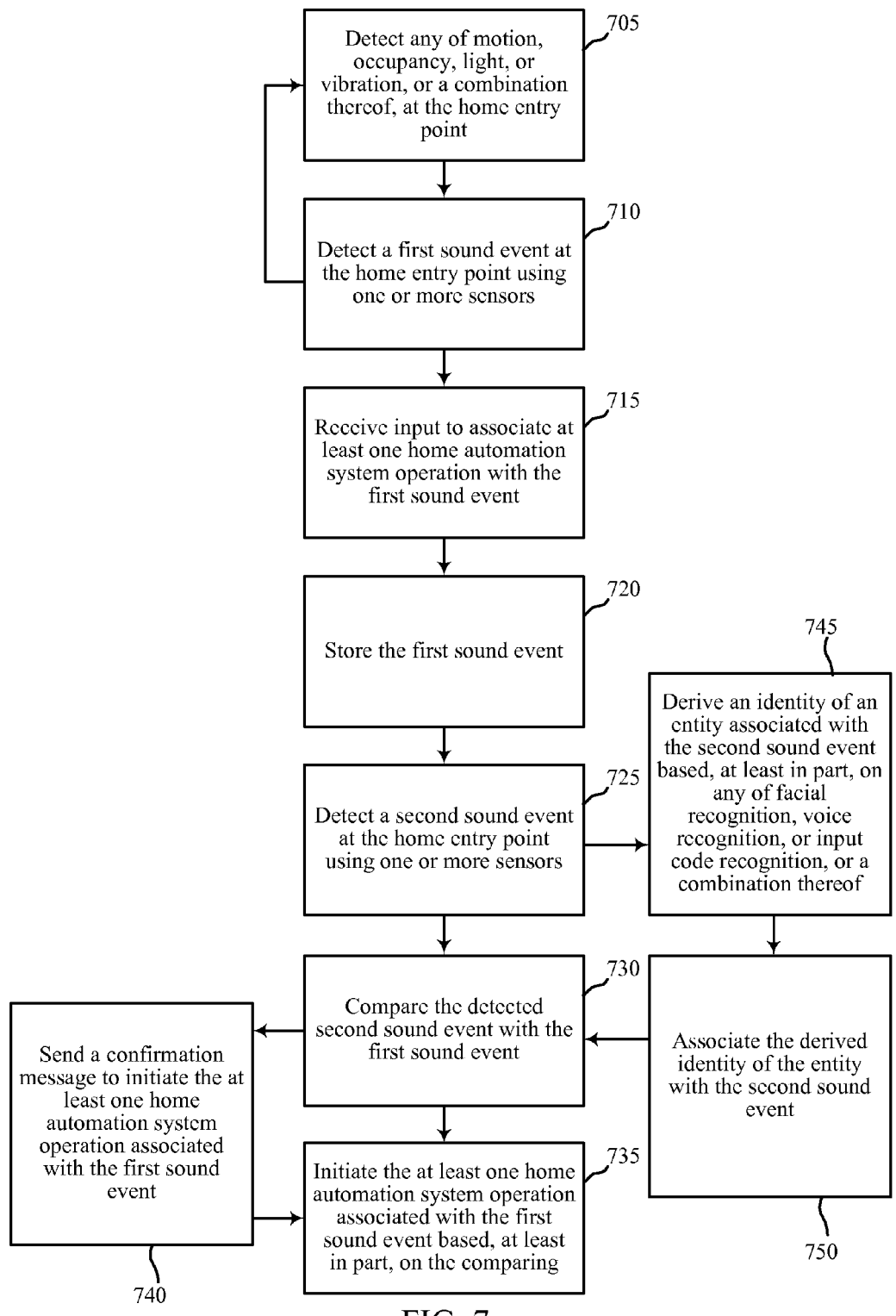
FIG. 7 is a flow chart illustrating an example of a method relating to a security and/or automation system, in accordance with various aspects of this disclosure.

FIG. 7 is a flowchart illustrating an example of a method 700 for receiving input regarding at least one home automation system operation associated with a first sound event, and comparing a detected second sound event with the first sound event to determine whether to initiate the at least one home automation system operation associated with the first sound event, in accordance with various aspects of the present disclosure. For clarity, the method 700 is described below with reference to aspects of one or more of the sensor units 110, local computing device 115, 120, control panel 135, and/or remote computing device 140 described with reference to FIGS. 1-4, and/or aspects of one or more of the apparatus 205, 205-*a*, or 205-*b* described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 705, the method 700 may include detecting any of motion, occupancy, light, or vibration, or a combination thereof, at the home entry point. As previously discussed, the detection of one or more sound event may be performed on a continuous or interval basis in some embodiments, while in other embodiments, the detection of a sound event may be triggered only by the detection of occupancy data at the home entry point. This may help to reduce false alarms or to reduce energy consumption, such that the home automation system may only "listen" for sound events at the home entry point when an approaching entity is detected. In some embodiments, the one or more sensor units that are operable to detect occupancy data may additionally be operable to detect sound events, while in other embodiments, separate one or more sensor units may be used to detect each parameter. The method 700 may repeat between steps 705 and 710 any number of times, where the home automation system may "listen" for sound events at any time upon detecting approach of an entity to the home entry point.

Blocks 710, 715, and 720 of method 700 may correlate to blocks 605, 610, and 615 as illustrated with respect to method 600 in FIG. 6. Specifically, block 710 of method 700 may include detecting a first sound event at a home entry point using one or more sensors; block 715 may include receiving input to associate at least one home automation system operation with the first sound event; and block 720 may include storing the first sound event. As previously discussed with respect to FIG. 6, the detected first sound event and associated input regarding at least one home automation system operation may be inputted by a homeowner as a system programming method, or may alternatively or in addition be the result of a sound event produced by an entity and a real-time response to the entity by the homeowner.

At block 725, the method 700 may include detecting a second sound event at the home entry point using one or more sensors. At block 730, the method 700 may include comparing the detected second sound event with the first sound event. Thus, where an entity approaches the entry point of the home on a later occasion and produces a second sound event, the detected second sound event may be compared with the stored first sound event to determine whether the two sound events are the same, and are therefore likely produced by the same entity. Where it is determined at step 730 that the first and second sound events are the same and have therefore likely been produced by the same entity, at block 735, the method 700 may include initiating the at least one home automation system operation associated with the first sound event based, at least in part, on the comparing. In this way, an entity visiting the homeowner and producing the same sound event each time may be met with the same response on each visit, for example by receiving a broadcasted audio or visual message, having the door be unlocked, having a light turned on, or the like.

In some embodiments, the method 700 may proceed from block 725 to block 745, at which the method 700 may include deriving an identity of the entity associated with the second sound event based, at least in part, on any of facial recognition, voice recognition, or input code recognition, or a combination thereof. Thus, while the entity producing the second sound event may be identified as the same entity who produced the first sound event based on the comparing at block 730, the method 700 may additionally comprise corroborating or augmenting the identification of the entity using additional or alternative methods, such as voice or facial recognition, or by identifying a particular code inputted by the entity that is specific to that entity. In some embodiments, the voice or facial recognition may be drawn from a homeowner-stored library of entity identity data, while in other embodiments the visiting entity may be identified by comparing collected voice and/or facial data with publicly available databases, such as social media or government websites. This derived identity of the entity may then be associated with the detected second sound event at block 750. In this way, where the same sound event is detected in the future, the detected sound event may be associated with the identified entity, such that, for example, the homeowner may be notified of the identity of the visitor.

In some embodiments, the method 700 may proceed from block 730 to block 740, at which the method 700 may include sending a confirmation message to initiate the at least one home automation system operation associated with the first sound event. For example, where the home automation system has identified at block 730 that the entity producing the second sound event is likely the same entity who produced the first sound event at block 710, and therefore that the inputted home automation system operation preferences associated with the first sound event should accordingly be initiated in response to the second sound event, it may be desirable to request homeowner confirmation prior to initiating the system operation, to maintain security. Thus, where the inputted preferences relating to the home automation system operation indicate that the doors should be unlocked in response to the detected first sound event, the home automation system may communicate a confirmation request to the homeowner, for example at a dedicated application on the homeowner's personal computer or smartphone, prior to unlocking the doors. The communicated confirmation request may include a detailing of the operations to be initiated, and may be accompanied by a still photograph or video clip of the entity at the home entry point. In some embodiments, where the entity producing the second sound event has been identified by alternate or additional means at block 745, the identity of the entity may additionally be communicated to the homeowner. The homeowner may then decide whether the identification of the entity producing the second sound event was properly correlated to the entity producing the first sound event, and may provide his approval or denial of the proposed system operations accordingly. In this way, where, for example, a burglar has observed a knocking pattern of a welcome guest and attempts to imitate the same, the homeowner may be able to deny the burglar access to his home before the system automatically unlocks the door.

In some embodiments, this step of requesting confirmation may only accompany "high risk" system operations, such as unlocking or opening doors, while other, "lower risk" system operations, such as turning on lights, may be initiated automatically, without the need for homeowner approval. In some embodiments, the confirmation message may be communicated to the homeowner only after the one or more system operations have been initiated. In some embodiments, the homeowner may receive the confirmation request at a smartphone or personal computer, or in other embodiments at a control panel, and the homeowner may elect to approve some, all, or none of the actions requested to be taken by one or more components of the home automation system.

Thus, the method 700 may provide for monitoring sound event data and implementing one or more home automation system operations accordingly. It should be noted that the method 700 is just one implementation and that the operations of the method 700 may be rearranged or otherwise modified such that other implementations are possible.

In some examples, aspects from methods 600, 700 may be combined and/or separated. It should be noted that the methods 600, 700 are just example implementations, and that the operations of the methods 600-700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
   detecting a first sound event at a home entry point using one or more sensors;
   detecting a pattern of at least one home automation system operation performed in association with the first sound event;
   storing the first sound event;
   automatically deriving at least one operating instruction based at least in part on the detected pattern;
   detecting a second sound event at the home entry point using one or more sensors;
   comparing the second sound event with the first sound event; and
   initiating the at least one home automation system operation associated with the first sound event based at least in part on the derived at least one operating instruction.

2. The method of claim 1, further comprising:
   deriving an identity of an entity associated with the second sound event based, at least in part, on any of facial recognition, voice recognition, or input code recognition, or a combination thereof; and
   associating the derived identity of the entity with the second sound event.

3. The method of claim 1, further comprising:
   sending a confirmation message to initiate the at least one home automation system operation associated with the first sound event.

4. The method of claim 1, further comprising:
   continuously detecting one or more sound events using the one or more sensors.

5. The method of claim 1, wherein detecting the first sound event or the second sound event is triggered based, at least in part, on detecting any of motion, occupancy, light, or vibration, or a combination thereof, at the home entry point.

6. The method of claim 1, wherein the detected first sound event is the result of any of knocking, kicking, rapping, slapping, pounding, hitting, speaking, yelling, clapping, whistling, car engine running, walking, or ringing a bell, or a combination thereof.

7. The method of claim 2, wherein the at least one home automation system operation comprises any of activating or deactivating an audio alarm or chime, locking or unlocking a door, opening or closing a door, activating or deactivating an alarm system, triggering or silencing an alarm, turning on or off a light, activating or deactivating a video monitoring system, activating or deactivating a still photograph monitoring system, activating or deactivating an audio monitoring system, initiating a two-way communication, broadcasting a prerecorded audio message, displaying a prerecorded video message, communicating the identity of the identified entity associated with the first sound event or the second sound event, or communicating a picture or a video of the identified entity, or a combination thereof.

8. The method of claim 1, wherein the first sound event is stored in a sound event library that comprises any of sound clips or sound fingerprints, or a combination thereof.

9. The method of claim 8, wherein the sound fingerprints comprise data related to any of audio input intensity, source, duration, location, or pattern, or a combination thereof.

10. An apparatus for security and/or automation systems, comprising:
    a processor;
    memory in electronic communication with the processor; and
    instructions stored in the memory, the instructions being executable by the processor to:
    detect a first sound event at a home entry point using one or more sensors;
    detecting a pattern of at least one home automation system operation performed in association with the first sound event;
    store the first sound event;
    automatically derive at least one operation instruction based at least in part on the detected pattern;
    detect a second sound event at the home entry point using one or more sensors;
    compare the second sound event with the first sound event; and
    initiate the at least one home automation system operation associated with the first sound event based at least in part on the derived at least one operating instruction.

11. The apparatus of claim 10, wherein the instructions are further executable by the processor to:
    derive an identity of an entity associated with the second sound event based, at least in part, on any of facial recognition, voice recognition, or input code recognition, or a combination thereof; and
    associate the derived identity of entity with the second sound event.

12. The apparatus of claim 10, further comprising:
    sending a confirmation message to initiate the at least one home automation system operation associated with the first sound event.

13. The apparatus of claim 10, wherein detecting the first sound event or the second sound event is triggered based, at least in part, on detecting any of motion, occupancy, light, or vibration, or a combination thereof, at the home entry point.

14. The apparatus of claim 10, wherein the detected first sound event is the result of any of knocking, kicking, rapping, slapping, pounding, hitting, speaking, yelling, clapping, whistling, car engine running, walking, or ringing a bell, or a combination thereof.

15. The apparatus of claim 11, wherein the at least one home automation system operation comprises any of activating or deactivating an audio alarm or chime, locking or unlocking a door, opening or closing a door, activating or deactivating an alarm system, triggering or silencing an alarm, turning on or off a light, activating or deactivating a video monitoring system, activating or deactivating a still photograph monitoring system, activating or deactivating an audio monitoring system, initiating a two-way communication, broadcasting a prerecorded audio message, displaying a prerecorded video message, communicating an identity of identified entity associated with the first sound event or the second sound event, or communicating a picture or a video of the identified entity, or a combination thereof.

16. The apparatus of claim 10, wherein the first sound event is stored in a sound event library that comprises any of sound clips or sound fingerprints, or a combination thereof.

17. The apparatus of claim 16, wherein the sound fingerprints comprise data related to any of audio input intensity, source, duration, location, or pattern, or a combination thereof.

18. A non-transitory computer-readable medium storing computer-executable code, the code executable by a processor to:
    detect a first sound event at a home entry point using one or more sensors;

detect a pattern of at least one home automation system operation performed in association with the first sound event;
store the first sound event;
automatically derive at least one operating instruction based at least in part on the detected pattern;
detect a second sound event at the home entry point using one or more sensors;
compare the second sound event with the first sound event; and
initiate the at least one home automation system operation associated with the first sound event based at least in part on the derived at least one operating instruction.

* * * * *